Patented July 11, 1933

1,917,451

UNITED STATES PATENT OFFICE

HANS LEBACH AND JOHANN KARL WIRTH, OF BERLIN-ALTGLIENICKE, GERMANY, ASSIGNORS TO SÄURESCHUTZ GESELLSCHAFT M. B. H., OF BERLIN-ALTGLIENICKE, GERMANY

PROCESS FOR THE PRODUCTION OF MOLDED ARTICLES FROM PLASTIC COMPOSITIONS

No Drawing. Application filed July 22, 1930, Serial No. 469,920, and in Germany April 9, 1929.

In the production of molded articles, such as plates, containers, tubes etc. from plastic compositions which—like the known phenol-formaldehyde condensation products—are or become soft or thinly fluid, either in the cold or when warmed, great difficulty is encountered in detaching the completely hardened articles from the molds. Attempts have been made to remedy this in the case, for example, of mixtures for pressing, by oiling the molds or incorporating paraffin or similar lubricants with the mixture. On the one hand, however, this procedure does not always prevent the pressed articles from sticking in the molds, and on the other hand, these oily or fatty additions constitute a foreign body which impairs the homogeneity of the articles.

It has now been ascertained that reliable separation between the mold and the molded article can be obtained by applying solid intermediate layers, which are destroyed during the hardening process, so as to leave, between the mold and molded article, a corresponding cavity which renders the separation of the parts easy. Suitable materials for the production of these solid intermediate layers comprise all substances which undergo decomposition at the known temperatures for hardening the phenol-formaldehyde condensation products, and like molding compositions which solidify when heated. They comprise, for example, collodion- celluloid-lacquer, layers of paper and fabric impregnated with chemicals which lead to the destruction of the cellulose fibre at higher temperature. This is the case, for example, with impregnation by sodium bisulphate or chromic acid.

*Example 1*.—For manufacturing a plate from a plastic mixture of artificial resin and asbestos fibre, a cast iron plate is faced with one or more layers of newsprint impregnated with a concentrated solution of sodium bisulphate. The paper is dried at ordinary, or slightly elevated temperature, and the plastic composition is then applied by rolling, kneading, stamping or the like. When the molding of the plastic composition is completed, the whole is placed in a stove or a pressure vessel, in which the artificial resin is hardened at temperatures between 80 and 180° C., for example. The increase in temperature causes the sodium bisulphate to give off sulphuric acid, which completely destroys the paper fibre. There is thus formed, between the support and the hardened layer of artificial resin, a loose stratum of carbonized paper and crystals of sodium sulphate, which enables the molded article to be detached from the support with ease. Detachment can be facilitated by immersion in water.

*Example 2*.—A press mold, for the production of any desired molding from a mixture of powdered artificial resin and filler material, is thinly coated with celluloid lacquer several times. After the film of lacquer is dry, the mold is filled with the composition mixture in known manner, and the molding and hardening are effected under pressure in the hot press. The high temperature employed destroys the coating of celluloid lacquer, so that the molded article can be easily removed from the mold.

The abovedescribed means for preventing the adhesion of molded articles to the mold may, of course, be applied in a mixed manner, concurrently or in succession. For example, a mold may be first coated, with one of the said cellulose lacquers and then covered with a layer of paper which has been impregnated with one of the said destructive chemicals.

Similarly, the described process may also be applied to such molded articles as are made of permanently fusible compositions, for example readily fusible alloys such as Wood's metal, by pouring into suitable molds. In this case, the destruction of the said intermediate layer is accomplished by the heat of the poured metal, so that, on cooling, an intermediate space, filled with loose carbon powder, is left, which facilitates separation.

We claim:

1. Process for the production of molded articles from plastic compositions, artificial resins or the like substances comprising coating the mold with substances impregnated with chemicals to destroy the substances at higher temperatures, drying the coating, applying the plastic composition, and hardening same in the heat.

2. Process for the production of molded articles from plastic compositions, artificial resins or the like substances comprising coating the mold with paper impregnated with chemicals to destroy the paper at higher temperatures, drying the coating, applying the plastic composition, and hardening same in the heat.

3. Process for the production of molded articles from plastic compositions, artificial resins or the like substances, comprising lining the mold with a layer of paper impregnated with sodium bisulphate, drying the lining, applying the plastic composition, and hardening same in the heat.

4. Process for the production of molded articles from plastic compositions, artificial resins or the like substances, comprising lining the mold with a layer of cotton cloth impregnated with sodium bisulphate, drying the lining, applying the plastic composition, and hardening same in the heat.

HANS LEBACH.
JOHANN KARL WIRTH.